Patented July 17, 1928.

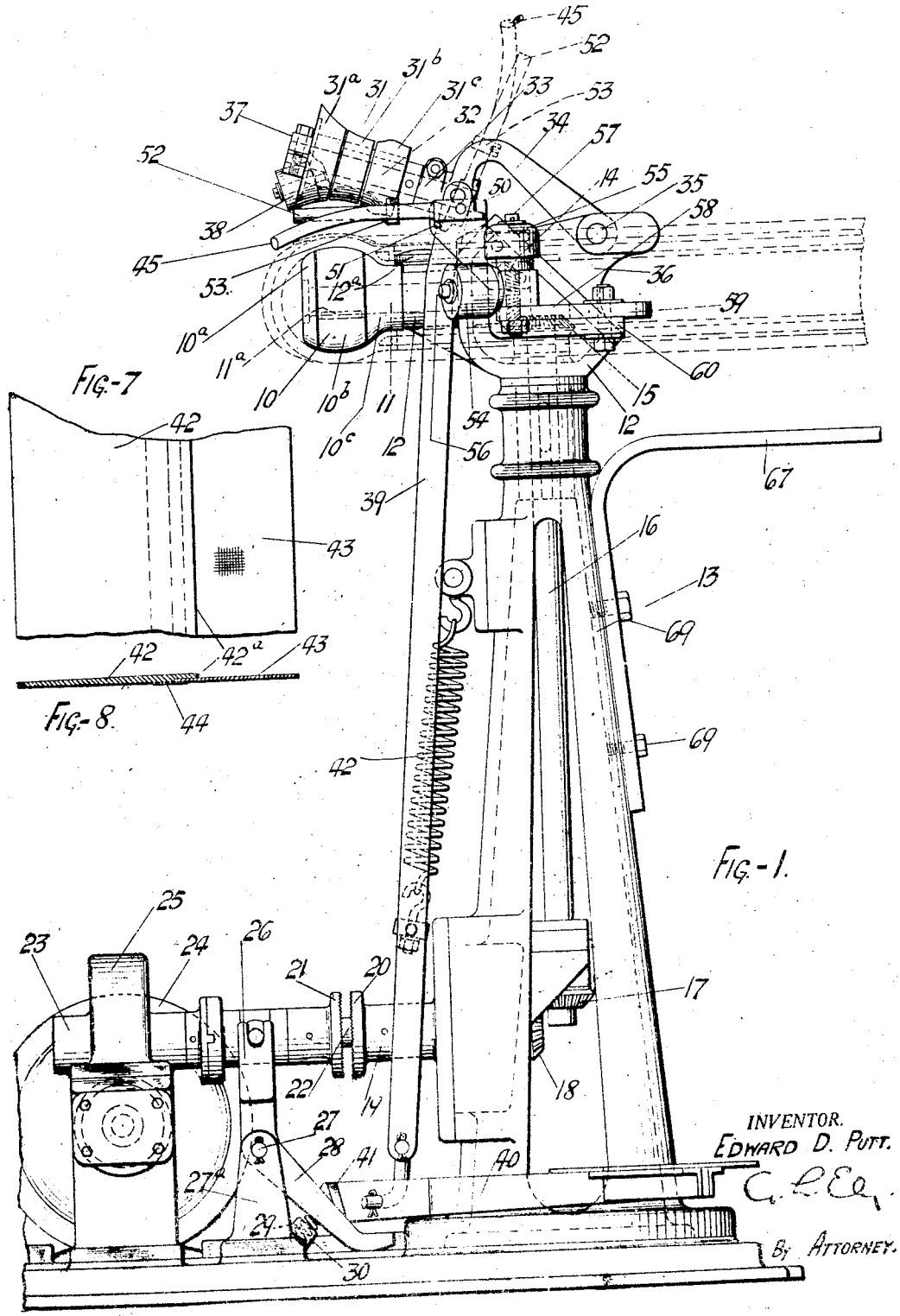

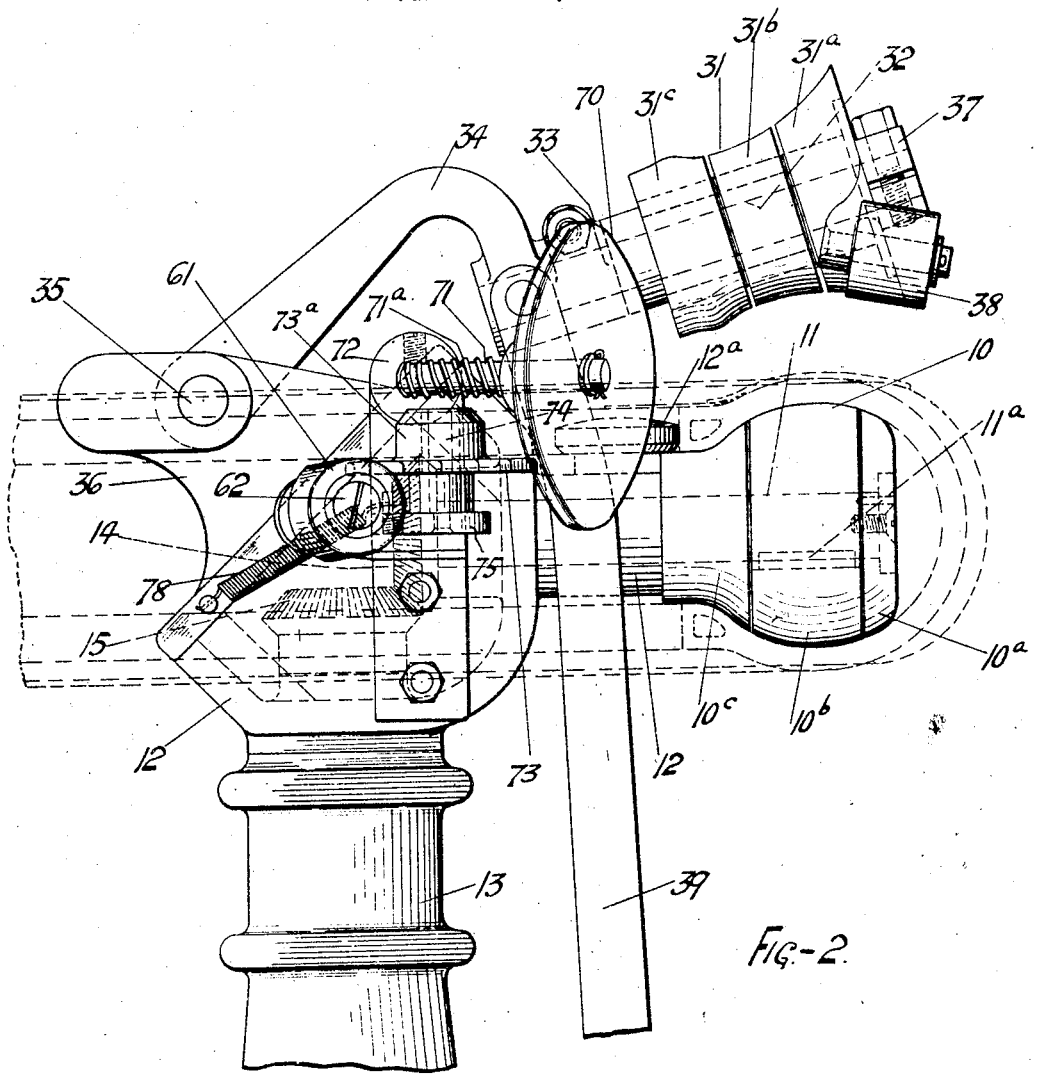

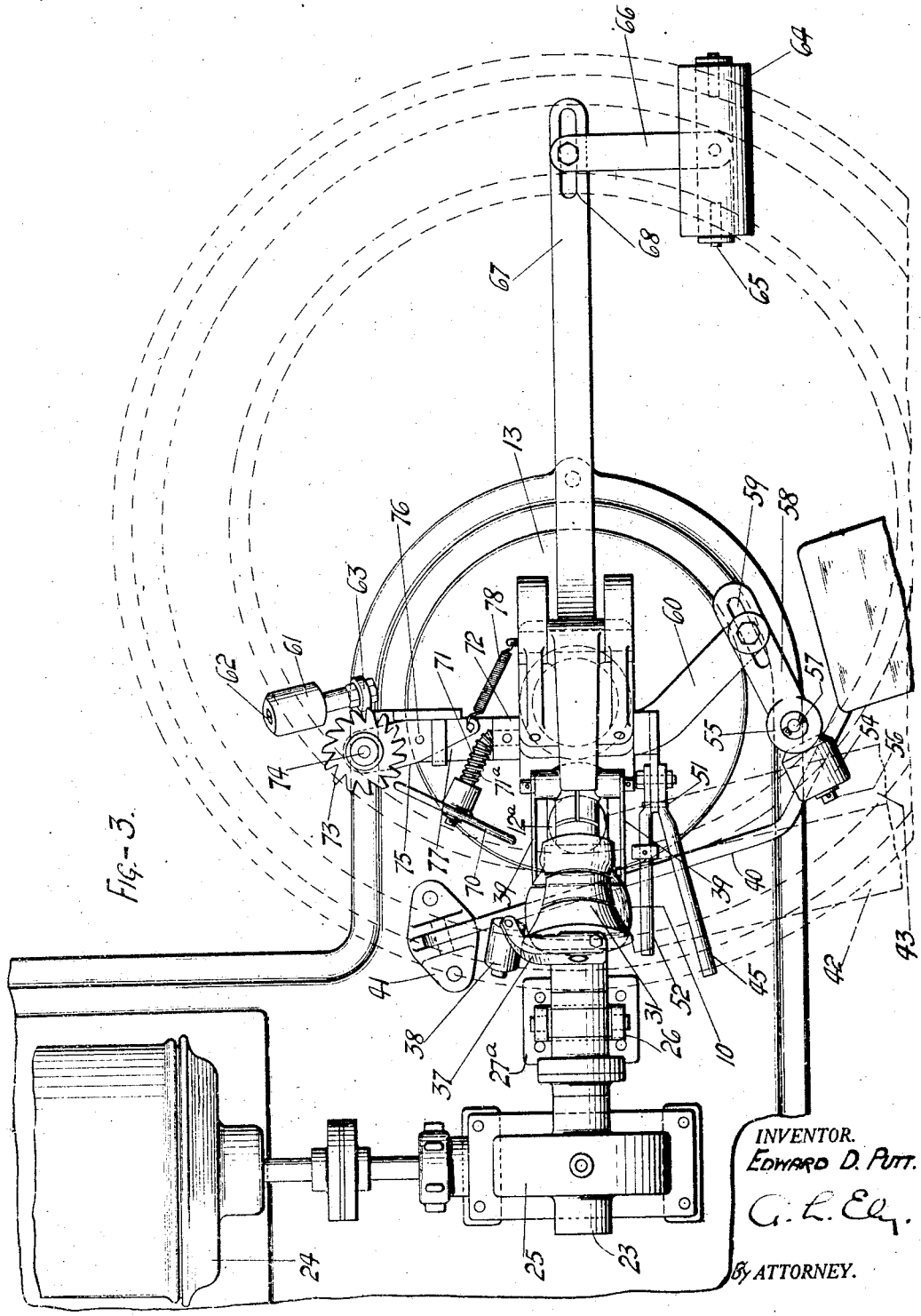

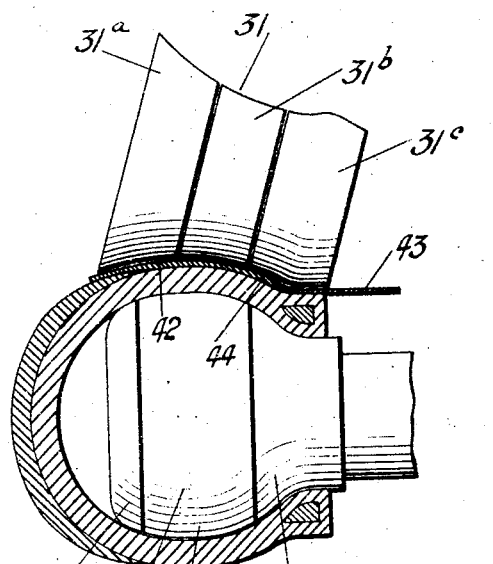
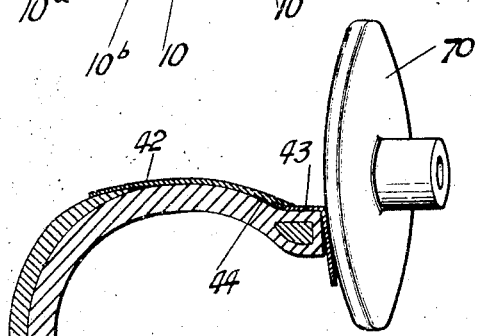
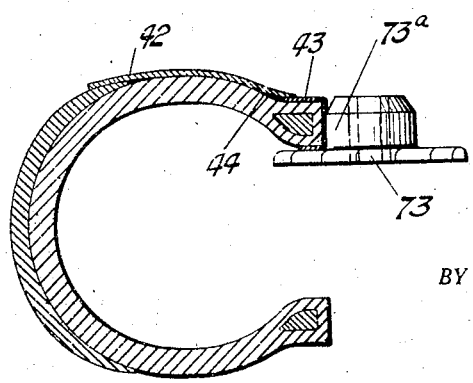

1,677,871

UNITED STATES PATENT OFFICE.

EDWARD D. PUTT, OF AKRON, OHIO, ASSIGNOR TO THE FIRESTONE TIRE AND RUBBER COMPANY, OF AKRON, OHIO, A CORPORATION OF OHIO.

TIRE-FINISHING MACHINE.

Application filed February 13, 1925. Serial No. 9,062.

This invention relates to tire finishing machines.

In the art of manufacturing tire casings, there has developed two distinct types of machines, the one for performing the "building" operations by which the fabric plies, the beads and the tread are applied to a rotatable core and the other for performing the "finishing" operations by which the side walls of the tire and the strips of fabric overlying the beads, usually called chafer strips, are applied. Until recently in the art, the finishing operations were also performed on a rotatable core, but an improved procedure has been to dispense with the core during the finishing operations.

The present invention is directed to improvements in machines for finishing tires removed from their building cores and in particular to provide means for quickly receiving, supporting and driving circumferentially a tire and particularly straight-side tires, in combination with improved means for accurately and effectively stitching the side wall and chafer strips, preferably as a composite strip previously assembled, into place on the tire.

The foregoing and other purposes or objects will appear as the following description is read in connection with the accompanying drawings illustrating one form or embodiment of the invention. It is to be understood that the invention is not limited to the single specific embodiment thereof shown and described.

Of the accompanying drawings:

Figure 1 is a front elevation of a machine constructed according to the invention;

Figure 2 is an enlarged rear elevation of the upper portion thereof;

Figure 3 is a plan thereof;

Figure 4 illustrates the first stitching operation performed by the machine;

Figure 5 illustrates the third stitching operation;

Figure 6 illustrates the fourth and last stitching operation;

Figure 7 is a plan of a portion of the composite side wall and chafer strip applied to the tire by the machine; and Figure 8 is a section therethrough.

Referring to the drawings, 10 is a tire supporting and driving roller arranged to receive a tire thereon as best shown in Figure 1. The roller 10 is composed of three independent rollers $10^a$, $10^b$ and $10^c$, the first and last of which are journaled onto a shaft 11 and the middle roller $10^b$ is keyed thereon as indicated at $11^a$. The provision of independent rollers is for the purpose of reducing friction such as would result from an integral roller 10 driving on portions of the tire of different radius. The shaft 11 is journaled on a bracket 12 mounted on a standard 13 and has secured thereon a bevel gear 14 meshed with a bevel gear 15 on a shaft 16 journaled in standard 13. Shaft 16 has a bevel gear 17 thereon meshed with a bevel gear 18 secured on a hollow shaft 19 journaled in standard 13 and provided with a clutch element 20 adapted to be engaged by a shiftable clutch element 21 keyed or splined onto a shaft 22. Shaft 22 is journaled in shaft 19 and in a bracket 23 and is arranged to be driven by a motor 24 through a suitable reduction indicated at 25. Clutch member 21 is adapted to be shifted by a yoke 26 interengaged therewith, yoke 26 being secured on a rock shaft 27 journaled in bracket $27^a$ and to which is secured a clutch operating arm 28 adapted to be operated as will later appear and which is cushioned by a spring 29 seated in a socket 30 in bracket $27^a$.

Arranged for movement toward and from roller 10 is a pressure stitcher roller 31 formed of three independently rotatable rollers $31^a$, $31^b$, $31^c$ adapted together to form a roller 31 of a profile corresponding to the profile of a tire from tread to bead. The rollers $31^a$, $31^b$ and $31^c$ are journaled on a spindle 32 secured in a bracket 33 formed on an arm 34 which is pivoted at 35 on a bracket 36 on standard 13. On the free end of spindle 32 there is clamped a bracket 37 on which a stitcher roller 38 is so journaled as to engage and stitch over the joint between a tread and side wall on a tire casing as will be explained. For moving roller 31 toward roller 10, a link 39 is connected to arm 34 and to a pedal lever 40 pivoted on a bracket 41. For normally urging the roller 31 away from roller 10, a tensile spring 42 is connected at one end to link 39 and at the other to standard 13 so as to urge link 39 upwardly. A roller $12^a$ is mounted on bracket 12 so as to engage the inner face of a tire bead to position the tire properly between rollers 10 and 31.

In order to speed up the operation of the machine, it is desirable that clutch members 20 and 21 be engaged as the stitchers 31 are moved onto a tire on roller 10 so that driving of the tire will be effected. Accordingly, arm 28 is arranged to extend under pedal lever 40 and is thus adapted to be depressed thereby against the action of spring 29, which latter is adapted to automatically throw out the clutch as pressure on pedal 40 is relieved.

Guiding devices are provided for supplying the composite side wall and chafer strip shown in Figures 7 and 8 to the tire between rollers 10 and 31. The composite strip includes side wall 42, chafer 43 and a gum strip 44 underlying the joint between strips 42 and 43. A curved guiding arm 45 is pivoted at 50 on standard 13 and is arranged to be limited in the position shown in Figure 1 by a stop 51. The arm 45 is arranged to have the composite strip pass thereover. A second arm 52 is also pivoted at 50 on standard 13 and is also limited in the position shown in Figure 1 by stop 51 which extends through and projects outwardly from the rear of the adjacent portion of standard 13. The arm 52 is to the rear of arm 45 and is arranged to have the composite strip pass thereunder and, in effect, to ride on the strip as will appear. To properly guide the composite strip onto the tire, an adjustable guiding collar 53 adapted to engage the edge 42$^a$ of side wall 42 is secured by a set screw or the like in any desired position on arm 52, the collar 53 riding directly on the chafer 43 on which it is held by weight of arm 52.

Since the tires must be properly positioned to be circumferentially driven in their own planes between rollers 10 and 31 and since it is preferable that they be driven in a horizontal plane, it is necessary to provide means cooperating with roller 10 for supporting the tires in the proper positions. This means may include a pair of rollers 54 and 55 arranged adjacent rollers 10 and 31 on one side thereof, the rollers 54 and 55 being respectively journaled on spindles 56 and 57 disposed at right angles to each other on a bracket 58 slotted at 59 so as to be adjustably bolted onto a bracket 60 secured on standard 13 whereby roller 54 may engage the inner side of the upper bead to support the tire; and roller 55, the inner edge of the upper bead to guide the tire properly between rollers 10 and 31. On the other side of rollers 10 and 31 and also adjacent thereto there is arranged a tire supporting roller 61 journaled on a spindle 62 secured on a bracket 63 on standard 13, roller 61 being adapted to pass under and support the upper bead of the tire. Substantially diametrically opposite to rollers 10 and 31 there is arranged a roller 64 on which the tire is adapted to rest, the lower side wall thereof resting on said roller. The roller 64 is journaled on a spindle 65 secured on an arm 66 adjustably bolted on the end of a bracket 67 slotted for such purpose at 68 and secured as by screws 69, 69 onto standard 13.

After the stitching operations performed by rollers 10 and 31 and by roller 38, the composite strip will be on the tire in the condition shown in Figure 4 with the inner portion of chafer strip 43 projecting inwardly of the tire from the upper bead. For performing the operation of stitching this portion of strip 43 downwardly onto the inner peripheral edge of the bead a stitcher 70 is employed. The stitcher 70 includes a rotatable disk journaled on a spindle 71 extending over its major portion substantially radially of the tire but bent inwardly at its inner end toward a bracket 72 in which it is secured, the bracket 72 being secured on standard 13. The stitcher 70 is adapted to fold the projecting position of strip 43 down against the inner edge of the upper bead as illustrated in Figure 5 and is yieldingly urged against said edge by a compression spring 71$^a$ on spindle 71.

There is next arranged for operation on the tire after the stitcher 70, a stitcher 73 in the form of a star wheel journaled on a spindle 74 secured on a lever 75 pivoted at 76 on a bracket 77 on standard 13. Star wheel 73 is adapted to fold the portion of chafer 73, projecting below the upper bead as illustrated in Figure 5, in under the bead and to stitch it in place against the inner side of the bead as illustrated in Figure 6. To hold star wheel 73 yieldingly against the bead, a tensile spring 78 is connected to lever 75 and to standard 13, the spring 78 being adapted to force a cylindrical portion 73$^a$ (Figures 2 and 6) of star wheel 73 against the inner edge of the upper bead to position the star wheel and to additionally stitch the chafer onto the inner edge of the bead.

In operation, motor 24 is continuously driven. The parts of the apparatus are normally in the positions shown in Figures 1 and 2 with the exception that the strip guides 45 and 52 are normally swung to the dotted line positions thereof indicated in Figure 1. A tire to be finished, as indicated in dotted lines in Figures 1 to 3 of the drawings, and usually already provided with the tread is mounted over roller 10, as illustrated in Figure 1, in such a manner that rollers 54 and 61 will engage the inner side of the upper bead and roller 55 will engage the inner peripheral edge thereof. In back of standard 13 the tire will rest on roller 64 engaged with its lower side wall. The tire is now positioned for receiving the composite finishing strip and is arranged to be driven circumferentially in a horizontal plane and to be progressively operated upon by stitches 31, 38, 70 and 73.

The composite strip is now drawn toward rollers 10 and 31 from any suitable source, as a reel (not shown). Guide device 45 is swung downwardly against pin 51 and the strip is passed thereover. Guide device 52 is then swung downwardly against pin 51 and the strip is positioned so that the collar 53 engages the edge 42ᵃ of the side of all strip 42. The end of the strip is then pressed in proper position onto the portion of the tire resting on roller 10.

Pedal lever 40 is now depressed to simultaneously press roller 31 against the tire and to engage clutch members 20 and 21. The tire is accordingly driven circumferentially on rollers 10, 61, 64 and 54 and in a clockwise direction as shown in Figure 3. Roller 31 stitches in place the side wall and chafer onto the outer side of the tire and bead, (Figure 4), stitcher 38 next stitches the joint of the side wall with the tread, stitcher 70 then folds downwardly the chafer 43 and stitches it to the inner edge of the bead (Figure 5), and stitcher 73 finally folds the chafer 43 radially outwardly of the tire against the inner side of the bead, (Figure 6). The various stitching operations, as described above, proceed progressively, the composite strip being continuously drawn by the tire respectively over and under guides 45 and 52, against which it is maintained by the operative, until the tire has completed a revolution. The pedal 40 is then released, spring 42 accordingly raising roller 31 to the position shown in Figure 1 and spring 29 disengaging the clutch members 20 and 21 whereby the tire stops. The operative cuts the strip to the right length, applies the cut end to the tire and again depresses lever 40 to feed the tire past the various stitchers sufficiently to complete the stitching operation. After one side of the tire is completed, the tire is removed from the machine and reinserted with the other side uppermost and the operations are repeated.

Modifications of the invention may be resorted to without departing from the spirit thereof or the scope of the appended claims.

What is claimed is:

1. In a tire finishing machine, means for circumferentially driving a tire casing, means for stitching a side wall onto the casing having a tread thereon, and means for stitching over the joint between the side wall and the tread, the two last-named means being arranged to act in succession.

2. In a tire finishing machine, means for supporting and rotating a tire casing having a tread thereon, movable means for stitching a side wall thereon, and means carried by said movable means for stitching over the joint between the side wall and tread, the two last-named means being arranged to act on the tire rim in succession.

3. In a tire finishing machine, means for supporting a straight side tire in a horizontal plane, said means including a circumferential series of rollers certain of which are arranged to engage the inner side of a bead and certain others of which are arranged to engage the inner peripheral edge of a bead.

4. A tire finishing machine comprising, means for supporting a straight side tire in a horizontal plane, said means including a circumferential series of rollers certain of which are arranged to engage the inner side of a bead and certain others of which are arranged to engage the inner peripheral edge of a bead, and means for circumferentially driving said tire on said rollers.

5. A tire finishing machine comprising, means for supporting a tire in a horizontal plane, said means including a circumferential series of rollers certain of which are arranged to engage the inner side of a bead and certain others of which are arranged to engage the inner peripheral edge of a bead, means operable in the tire casing for circumferentially driving said tire on said rollers, and stitcher devices arranged over said driving means to exert pressure on said casing to progressively apply a strip of material upon the tire as it is driven on said rollers.

6. A tire finishing machine comprising stitching means, means for supporting a tire in a horizontal plane in position to be actuated upon by the stitching means, said supporting means including a roller engaging the under surface of the upper side wall beneath the stitching means and a roller engaging under the tire at a position remote from the stitching means.

EDWARD D. PUTT.